2,943,112
ALKYLATION OF DIPHENYLAMINE

Ivan C. Popoff, Ambler, Paul G. Haines, Lafayette Hills, and Charles E. Inman, Glenside, Pa., assignors to Pennsalt Chemicals Corporation, Philadelphia, Pa., a corporation of Pennsylvania No Drawing. Filed Nov. 6, 1957, Ser. No. 694,707

11 Claims. (Cl. 260—576)

This invention relates to the alkylation of diphenylamine. It is particularly concerned with the production of diphenylamine alkylates for use as anti-oxidants in rubber compositions.

Alkylated diphenylamines are widely used as anti-oxidants for natural and synthetic rubber. They may be prepared in a variety of ways such as by alkylation of diphenylamine with the appropriate alcohol, alkyl halide, aliphatic carbonyl compound or olefin. Anti-oxidants produced from diphenylamine by alkylation with acetone for example have been used in tires and other dark colored articles for many years. Acetone alkylates however, and alkylates in general containing the lower alkyl groups, e.g. propyl and butyl, have a rather pronounced darkening or staining effect and thus cannot be used with white or relatively light colored rubbers. For such rubbers, alkylated diphenylamines containing higher alkyl groups, viz. $C_5$ to $C_{12}$, are employed since it has been found that this type of product has a considerably diminished staining effect.

Such relatively non-staining alkylates are commonly prepared by alkylating diphenylamine with $C_5$ to $C_{12}$ olefins such, for example as heptenes, octenes, nonenes, styrene—diisobutylene mixtures, etc., in the presence of acidic alkylation catalysts, the olefins being employed in preference to other alkylating agents because of their considerably lower cost. In carrying out such alkylations however it has been found that the crude reaction products often contain substantial amounts of unreacted diphenylamine. This is particularly true when the olefin or olefin mixture consists predominantly of relatively unreactive types such as secondary monoalkenes e.g. octene-2, nonene-2, etc. The unreacted diphenylamine in the reaction product is objectionable in that it is highly staining and unless reduced to low concentrations such as 3% or so, will render the product unsuitable for light colored rubbers. In some cases also, substantial amounts of diphenylamine mono-alkylated with lower alkyl groups, such as mono-tertiary butyl diphenylamine, is formed, probably by cleavage of a higher olefin employed in the alkylation, such for example as by the cleavage of octene to isobutylene. Such side products are also staining and thus objectionable, and in addition sometimes have undesirable effects on the physical properties of the anti-oxidant.

In prior practice, unreacted diphenylamine when present in objectionable amounts has been removed by high temperature, high vacuum distillation of the crude product. Such distillation techniques, made necessary by the high boiling points and thermolabile properties of the products, are expensive and often result in rather high product losses. In some cases the cost of thus separating unreacted diphenylamine may represent 30% of the total cost of the product.

In accordance with this invention, a method has been found by which such unreacted diphenylamine, and often other undesirable products such as mono-tertiary butyl diphenylamine present in the crude diphenylamine alkylate, can be substantially eliminated, or at least reduced to unobjectionable amounts, without resort to expensive and often wasteful high temperature, high vacuum distillation. In its broader aspects the invention is based on the discovery that when the crude alkylate, consisting predominantly of mono- and di-alkylated diphenylamine but containing minor though still objectionable amounts of unreacted diphenylamine, is further alkylated with certain olefins, such as styrene or certain diisobutylene isomers, what appears to be a preferential alkylation or scavenging, of unalkylated diphenylamine will take place, reducing the concentration of residual unreacted diphenylamine to low, unobjectionable concentrations. Such treatment furthermore, will sometimes reduce the amount of undesirable side products, such as the mono-tertiary butyl diphenylamine mentioned above, as will appear from the examples which follow.

The seemingly preferential alkylation, or scavenging of the residual unreacted diphenylamine in the presence of relatively large amounts of mono-alkylated diphenylamine would not be expected. On the contrary it could be expected that the additional olefin would be consumed almost entirely in the alkylation of the mono-alkylated diphenylamine which is present in large quantities in contrast to the relatively small quantities of residual diphenylamine. Furthermore, theory would predict that the mono-alkylated diphenylamine would alkylate more readily than unalkylated diphenylamine even when present in equivalent concentrations. Still further, it has been found that the scavenging effect of the added olefin will occur in spite of its dilution by considerable quantities of the olefin used in the initial alkylation.

Olefins which have been found to be effective in apparently preferentially alkylating or scavenging unreacted diphenylamine in the crude alkylate include vinyl benzene (styrene)

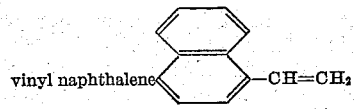

vinyl naphthalene

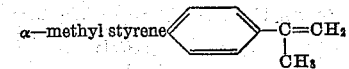

and the α-methyl substituents of these two compounds, viz.

α—methyl styrene

and

α—methyl vinyl naphthalene

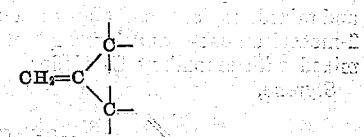

A second class of olefins effective as scavengers includes tertiary olefins having a terminal double bond, i.e. containing the group

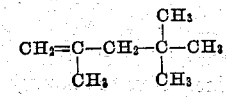

and having from 4 to 10 carbon atoms in the molecule. Examples of this class of compounds are 2,4,4, trimethyl pentene-1, $$CH_2=C-CH_2-C-CH_3$$
$$\quad\ \ |\qquad\quad\ |$$
$$\quad\ CH_3\qquad CH_3$$

(which occurs as a predominant component in commercial diisobutylene produced by polymerizing isobutylene), 2-methyl butene-1 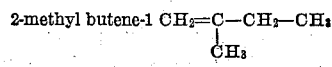

2-ethyl hexene-1 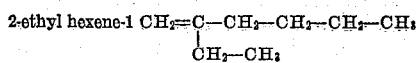

and isobutylene,

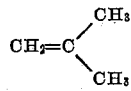

The compound 2-methyl butene-2,

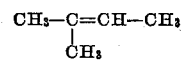

a $C_5$ tertiary olefin having an internal double bond also has substantial scavenging activity. Another class effective as scavengers includes conjugated diolefins having from 4 to 10 carbon atoms in the molecule, examples of this class being butadiene, isoprene, and cyclopentadiene 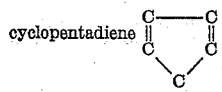

It is not necessary to employ the scavenging olefin in the pure form; it may be mixed with other olefins ineffective as scavengers. For example, commercial diisobutylene prepared by polymerizing isobutylene is predominantly a mixture of two isomers 2,4,4,trimethyl pentene-1 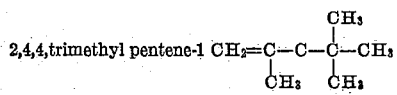

and 2,4,4,trimethyl pentene-2 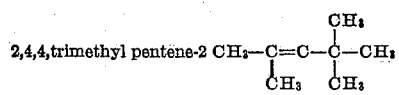

The former compound is an effective scavenger in a diphenylamine containing alkylate while the second is not. It is not economical, nor necessary, to separate the two isomores for use in accordance with the invention. The commercial mixture may be employed as such. Similarly commercial mixed amylenes are often a mixture of compounds such as 2-methyl butene-1 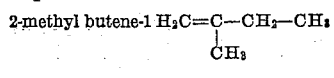

2-methyl butene-2 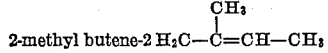

which are effective scavengers, and pentene-1

$$CH_2=CH-CH_2-CH_2-CH_3$$

and pentene-2 $CH_3-CH=CH-CH_2-CH_3$ which are not.

Preferred scavenging agents from the standpoint of effectiveness, cost and availability are styrene; diisobutylene from the polymerization of isobutylene consisting predominantly of the isomer 2,4,4, trimethylpentene-1; and mixed amylenes containing a substantial proportion of 2-methyl butene-1 and 2-methyl butene-2 which may be mixed with secondary $C_5$ olefins.

Styrene,

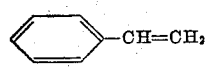

unsubstituted either in the benzene nucleus or the vinyl group, is particularly preferred. It is readily available, and a highly effective scavenging agent. It is also particularly advantageous in that it is available at reasonable cost in relatively pure form. Other scavengers such as mixed amylenes contain substantial amounts of olefins, such as pentene-2 ineffective as scavengers. Furthermore, styrene is a liquid and thus easily handled. With styrene the secondary or scavenging alkylation can be carried out at the same pressure as the primary alkylation in contrast to isobutylene for example which may require higher pressures because of its low boiling point.

The invention provides an improved method for preparing alkylated diphenylamines from inexpensive but relatively unreactive olefins. Relatively unreactive olefins include particularly those of the secondary alkene type (i.e. alkenes in which each carbon of the double bond is bonded to at least one hydrogen) having either terminal or internal double bonds such for example as nonene-1 or nonene-2; and those of the tertiary alkene type (i.e. alkenes having at least one carbon of the double bond bonded to three carbon atoms) greater than $C_5$ in size and in which the double bond is internal rather than terminal such for example as 2-methyl pentene-2, 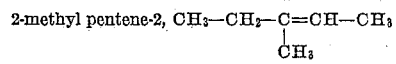

or 3,4 dimethyl hexene-3 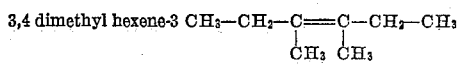

With such olefins it is difficult to produce a diphenylamine alkylate free from objectionable quantities of unreacted diphenylamine. Depending on the particular olefin employed and the reaction conditions the crude alkylate may contain as much as 25%, although more usually from 6% to 12% of unreacted diphenylamine (based on the crude alkylate after removal of excess olefin). Even with prolonged reaction times and a relatively large excess of olefin (e.g. olefin: diphenylamine molar ratios of 4:1) it is difficult to reduce the amount of unreacted diphenylamine to unobjectionable levels. By use of the present invention however, the initial alkylate can be treated with a scavenging olefin to produce a low diphenylamine content product without resort to expensive vacuum distillation.

Broadly the invention is applicable to the production of diphenylamine alkylates where the alkyl substituents range from $C_3$ to $C_{12}$ in size, but is particularly valuable in its application to the production of alkylates in which the alkyl substituent is $C_5$ and above which provide good quality relatively non-staining rubber anti-oxidants. In its particularly preferred embodiments the invention is applicable to the production of hexylated, heptylated, octylated, nonylated or decylated diphenylamines by using relatively inexpensive hexenes, heptenes, octenes, nonenes, decenes, or mixtures of these olefins of varying carbon content, consisting predominantly of secondary alkenes, and tertiary alkenes having internal double bonds. Such olefins are often produced as by-products of petroleum refinery operations such as catalytic cracking of gas oil; by the polymerization of propylene to produce isomeric hexenes or nonenes and other similar relatively inexpensive sources.

Generally speaking, both the primary and the secondary (i.e. scavenging) alkylation can be carried out under any of the commonly employed alkylating conditions. These include the use of acidic alkylation catalysts, e.g. $AlCl_3$, $ZnCl_2$, $SnCl_4$, $HCl$, $H_3PO_4$, $H_2SO_4$, $BF_3$, etc.; anhydrous media; temperatures ranging from 120° C. to 250° C. and preferably 160–200° C.; pressures ranging from atmospheric to 500 p.s.i.g. (pounds per square inch gage) or more, and preferably 15 to 250 p.s.i.g.; and reaction periods of from ½ hr. to 10 hr. The molar ratio of olefin to diphenylamine in the primary alkylation should range from 1:1 to 10:1 and preferably from 3:1 to 5:1.

Following the primary alkylation, the scavenging olefin, preferably styrene, is added to the reaction mixture usually containing from 6 to 12% by weight unreacted diphenylamine (based on the weight of the product after stripping off unreacted olefin). The scavenging olefin is preferably introduced without prior separation of any of the components of the crude reaction mixture so that the secondary alkylation takes place in the presence of excess original olefin and the original catalyst. Similar reaction conditions are employed in the secondary or scavenging alkylation. The amount of scavenging olefin to be used in the secondary alkylation depends upon the amount of unreacted diphenylamine present and the amount, if any, of lower mono-alkyl diphenylamine (e.g. mono-propyl or mono-tertiary-butyl diphenylamine) which is to be converted into the less staining dialkylated form. Generally a molar excess of scavenger olefin over the combined amounts of these constituents should be used; preferably from 2 to 5 mols of scavenger olefin per mole of unreacted diphenylamine and in addition a similar molar ratio of scavenger olefin with respect to such lower mono-alkylated components. The amount of scavenger used and the conditions, such as reaction time, of the secondary alkylation should of course be adjusted to produce the desired reduction in the residual amount of unalkylated diphenylamine and other undesired products if any. Generally the percentage of unalkylated diphenylamine should be reduced to below 5% and preferably below 3% to provide a satisfactory relatively non-staining rubber anti-oxidant.

According to a particularly preferred embodiment of the invention both the primary and secondary alkylations are carried out in the presence of a catalyst consisting of an acid activated clay of the type commonly used as a bleaching earth for oils and waxes rather than the commonly employed more highly acidic catalysts such as $AlCl_3$ or $ZnCl_2$. Such acid activated clays are well known, being commonly prepared by the acid activation of sub-bentonites (i.e. bentonites which in the air dry state are characterized by rapid slaking and only a slight swelling when placed in water), consisting predominantly of the clay mineral montmorillonite. Acid activation is achieved by digestion in strong mineral acids (most commonly $H_2SO_4$ and HCl) followed by washing, filtering and air drying.

The amount of such acid activated clay to be employed is not critical. Generally it should be used in quantities ranging from about 20 to 100 and preferably from 30 to 60 grams per mol of diphenylamine.

Although such acid activated clays may be employed as received without additional acid activation, in many cases additional acid activation will give superior results. This may be accomplished by adding concentrated acids, e.g. 95% $H_2SO_4$ to the reaction mixture. The quantity of added acid may vary considerably but is preferably kept within the range of from 0.5 to 2.5 ml. of concentrated acid per gram mol of diphenylamine. The added acid becomes adsorbed on the clay catalyst. The addition of acid in quantities substantially greater than those which can be adsorbed by the clay should be avoided if the advantages of a low-acidity reaction medium are to be obtained.

The use of an acid-activated clay catalyst in place of the more highly acidic catalysts usually employed has many advantages. It provides a relatively low acidity reaction medium which minimizes olefin polymerization and reactor corrosion. This affords a lower content of inert polymeric materials which dilute the product and may decrease average anti-oxidant activity. Olefin cleavage is reduced, e.g. cleavage of octenes to isobutylene, and thus smaller quantities of the lower, more staining alkyl-diphenylamines are formed. The catalyst may be separated from the organic material by simple filtration after reaction is completed. Acid neutralization is greatly simplified since most of the acid remains adsorbed in the clay. The little residual acidity that is retained in the organic material may be removed by anhydrous neutralization thus permitting more rapid and simpler processing. Since even traces of acidic materials are deleterious to rubber compositions complete neutralization of the reaction mixture is necessary. Using more highly acid catalysts such as $AlCl_3$ aqueous neutralizations and washings are necessary. Excesses of alkali must be used and in turn removed to permit proper vulcanization of the rubber stocks. These steps are time consuming and tend to give emulsions which are difficult to separate. Another advantage of the clay catalyst is that it can be recovered and reused.

Previously, such mild acid-activated clay catalysts have not generally been commercially employed despite the above advantages since the mild alkylating conditions which they provide do not lead to particularly high conversions of the diphenylamine. In accordance with the present invention however it has been found that by the use of the above defined class of scavenging olefins and despite the relatively mild alkylating conditions provided by the acid activated clay catalysts, the residual diphenylamine in the crude reaction product can be alkylated in the presence of such a catalyst with remarkable specificity to produce a rubber anti-oxidant product having excellent non-staining properties. Since the same clay catalyst is used for both alkylations all the above advantages are retained while at the same time the usual expensive vacuum distillation of the unreacted diphenylamine is avoided.

The following examples illustrate specific embodiments of the invention.

EXAMPLE 1

A mixture of 169 grams (1.0 mol) of diphenylamine, 504 grams (4.0 mols) of a mixture of isomeric nonenes, 55 grams of Filtrol clay No. 22 and 1.5 grams of concentrated sulfuric acid was stirred for 4 hours at 185–190° C. in a 0.5 gallon autoclave. The isomeric nonenes employed were derived from the polymerization of propylene, consisting predominantly of secondary olefins, the major portion being dimethyl heptenes, and the ratio of isomers containing internal to those containing terminal double bonds being approximately 2:1. The Filtrol clay No. 22 is an acid activated bleaching earth sold by the Filtrol Corporation having a particle size of 100% through 100 mesh, 90% through 200 mesh and 75% through 325 mesh, a particle density of 1.3 grams per cubic centimeter, a surface area (by nitrogen adsorption) of 275 square meters per gram, and having a chemical analysis on a volatile-free, oxide basis as follows: 70.9% $SiO_2$, 17% $Al_2O_3$, 3.9% $Fe_2O_3$, 3.2% $MgO$, 1.6% $CaO$, 2.0% $SO_3$, 1% $K_2O+Na_2O$, and 0.6% $TiO_2$.

During the reaction the autogenous autoclave pressure was about 33 p.s.i.g. After the 4 hour reaction period a small sample (10% of the mixture) was taken, filtered, neutralized with anhydrous sodium carbonate and distilled to remove unreacted nonene. The residue was filtered and analyzed by infra-red analysis and shown to contain 8.5% free diphenylamine. The alkylated portion consisted of a mixture of p-mono and p,p'-dinonylated diphenylamine. Forty-seven grams (0.45 mol) of styrene was added to the reaction mixture in the autoclave without distilling off excess nonene and stirred for 1 hour at 185–190° C. at approx. 33 p.s.i.g. autogenous autoclave pressure. After cooling, the reaction mixture was filtered, 10 grams of anhydrous sodium carbonate was added to the filtrate and distilled up to 200° C. pot temperature to remove unreacted nonene. The mixture was then steam distilled at 130–140° C. to remove olefin polymer. The dry distillation residue was filtered to remove inorganic salts and 344 grams of final product was obtained consisting of a yellow oil with a specific gravity of 0.95. Infra-red analysis of the product showed a content of 3.7% nitrogen and 2.2% free diphenylamine. The average number of nonyl substituents per molecule of diphenylamine was 1.65.

EXAMPLE 2

A mixture of 169 grams (1.0 mol) diphenylamine, 392 grams (4.0 mols) of isomeric heptenes, 55 grams of the acid activated clay employed in Example 1, and 1.5 cubic centimeters of concentrated sulfuric acid was stirred for 4 hours at 185–190° C. in a 0.5 gallon autoclave; the autogenous pressure was 80–100 p.s.i.g. The isomeric heptenes employed consisted primarily of secondary heptenes and tertiary heptenes having internal double bonds. Analysis of a sample (10% of total mixture) after the initial four hour reaction period showed a content of unreacted diphenylamine of approximately 7%.

Forty-seven grams (0.45 mol) of styrene was added to the crude alkylate in the autoclave and stirred for one hour at 185–190° C. at 75–80 p.s.i.g. autogenous autoclave pressure. After cooling, the reaction mixture was filtered, neutralized with anhydrous sodium carbonate and distilled up to 200° C. pot temperature to remove unreacted heptene after which it was steam distilled at 130–135° C. to remove olefin polymer and then filtered.

Three hundred ten grams of heptylated, styrene scavenged diphenylamine was obtained. It was a clear, pale yellow oil. Analysis of the product using infra-red absorption show that the product contained 2.15% free diphenylamine. The average number of heptyl substituents per molecule was 1.9.

EXAMPLE 3

A mixture of 169 grams (1 mol) of diphenylamine, 55 grams of the acid activated clay employed in Example 1, 1.4 milliliters of concentrated sulfuric acid, and 448 grams (4 mols) of isomeric octenes was heated and stirred for 4 hours at 185–190° C. in an autoclave. The autogenous pressure during the reaction was approx. 60 p.s.i.g. The isomeric octenes employed consisted predominantly of secondary octenes and tertiary octenes having internal double bonds.

The hot autoclave was vented through a condenser and most of the excess octene was distilled off. At this point the crude alkylate contained approx. 7% unreacted diphenylamine, and approx. 7% mono-tertiary butyl diphenylamine.

To the residue in the autoclave was quickly added 224 grams (2 mols) of diisobutylene and stirring was again continued for 1 hour at 180–185° C. under an autogenous pressure of approx. 60 p.s.i.g. The diisobutylene employed was obtained by the polymerization of isobutylene and consisted of approximately 75% 2,4,4,trimethyl pentene-1, 23% 2,4,4,trimethyl pentene-2 with about 2% of other octene isomers.

After cooling, the reaction mixture was filtered, neutralized with anhydrous sodium carbonate and distilled up to 200° C. pot temperature to remove residual unreacted octene and then steam distilled to distill off any olefin polymer. The warm product was dried by blowing with dry nitrogen and the sodium carbonate removed by filtration. 357.5 grams of a light brown colored liquid product was obtained containing 1.5% diphenylamine and 1.2% mono-tertiary butyl diphenylamine. As may be seen from this example both the unreacted diphenylamine content as well as the content of undesirable mono-tertiary butyl diphenylamine are substantially reduced. The reduction of the latter compound probably occurs by its conversion to the dialkylated form.

EXAMPLE 4

A mixture of 169 grams (1 mol) of diphenylamine, 55 grams of the acid activated clay catalyst employed in Example 1, 1.2 milliliters of concentrated sulfuric acid, and 448 grams (4 mols) of mixed octenes was heated and stirred in an autoclave for 4 hours at 185–190° C. and an autogenous autoclave pressure of approx. 60 p.s.i.g. The isomeric octenes were similar to those employed in Example 3. Analysis of the crude alkylate showed a content of free diphenylamine of approximately 10% and 4.2% of mono-tertiary butyl diphenylamine.

Following the initial 4 hour reaction period, 56 grams (1 mol) of isobutylene was rapidly added under pressure from an attached charge tank. Stirring was continued for 1 hour at 185–190° C. and an autogenous autoclave pressure of 120 p.s.i.g. The product was purified as in the previous examples to provide a final product consisting of a light yellow colored liquid weighing 364 grams and containing 0.8% free diphenylamine and 0% mono-tertiary butyl diphenylamine as determined by an infrared absorption spectro metric method. The average number of octyl substituents per molecule was 1.74.

EXAMPLE 5

Example 4 was repeated except that the initial reaction period was reduced to 3 hours. The resulting liquid product after the secondary alkylation with isobutylene weighed 364 grams and contained 0.9% diphenylamine and 0.1% mono-tertiary butyl diphenylamine.

EXAMPLE 6

Example 4 was repeated substituting 1 mol (70 grams) if isomeric amylenes in place of isobutylene in the secondary alkylation. The isomeric amylenes employed consisted of approximately 15% 2-methyl butene-1, 40% 2-methyl butene-2, 40% pentene-2 and 5% pentene-1. The two tertiary olefins are effective scavengers while the two secondary olefins are not. The liquid product obtained weighed 360 grams and contained 2.5% unreacted diphenylamine and 2.4% mono-tertiary butyl diphenylamine. The average number of octyl substituents per molecule was 1.7.

The products of the above examples are suitable for use as relatively non-staining rubber anti-oxidants without further treatment. The following tests show the excellent properties of such products for that application. The following two rubber compounds were prepared:

*Table 1*

|  | Compound MA, parts by weight | Compound MB, parts by weight |
|---|---|---|
| Smoked Sheet Blend | 100.0 |  |
| Pale Crepe |  | 100.0 |
| Calcene T | 75.0 |  |
| Atomite Whiting |  | 50.0 |
| Titanium Dioxide |  | 20.9 |
| Zinc Oxide | 10.0 | 10.0 |
| Stearic Acid | 2.0 | 2.0 |
| Diphenylguanidine | 1.5 |  |
| Benzothiazyl disulfide |  | 1.0 |

To separate samples of each of the above two compounds the following anti-oxidant materials were added: (1) phenyl-beta-naphthylamine (a commonly used rather staining rubber anti-oxidant), (2) octylated diphenylamine prepared in accordance with Example 4 using an isobutylene scavenger, (3) nonylated diphenylamine prepared in accordance with Example 1 using a styrene scavenger and (4) octylated diphenylamine prepared as in Example 1 substituting octenes for nonenes and using a styrene scavenger. In each case 1% of the anti-oxidant material based on the rubber compound was employed. Cures were carried out for 15, 30 and 60 minutes on separate samples of each formulation. The cures were made at 280° F. for those prepared from compound MA and at 290° F. for those prepared from compound MB. A similar series of cures was carried out on compounds MA and MB to which no anti-oxidant had been added. Physical properties were determined before and after oxygen bomb aging at 70° C. and 300 p.s.i. for 4 days for samples prepared from compound MA and 7 days for those prepared from compound MB.

The Antioxidant Index of the samples was obtained by adding together the values for the percent tensile strength retained for the three cures in each series. This index is an indication of the anti-oxidant activity with better products having the higher index values. Discoloration tests were run by exposing strips of compound MB in the various series for 48 hours to an RS Sunlamp at a distance of ten inches and to outdoor sunlight for 7 days after which any change in color was noted. The following table tabulates the results of these tests:

Table II

| Antioxidant | Antioxidant Index | | | Color | |
|---|---|---|---|---|---|
| | MA | MB | Total MA and MB | Sunlamp | Outdoor |
| None | 0 | 147 | 147 | lt. straw | white. |
| Phenyl-beta-naphthylamine. | 223 | 244 | 467 | brown | dark brown. |
| Octylated diphenylamine (Isobutylene scavenged). | 186 | 239 | 425 | straw | lt. straw. |
| Nonylated diphenylamine (Styrene scavenged). | 188 | 248 | 436 | light tan | off-white. |
| Octylated diphenylamine (Styrene scavenged). | 197 | 238 | 435 | straw | lt. straw. |

From the above table it is apparent that the diphenylamine alkylates prepared in accordance with the invention are effective rubber anti-oxidants which show only a slight degree of staining.

The alkylated diphenylamine products of the invention are primarily useful as relatively non-straining anti-oxidants for rubber compositions. They may be incorporated in the rubber in any suitable manner, as such or in the form of a solution, by usual rubber compounding methods such as by roll milling, incorporation in the rubber latex, etc. They may be used with any of the various rubbers both natural and synthetic, reclaimed rubber, etc. They are also useful as anti-oxidants in lube oils, fats and the like.

We claim:

1. A method of alkylating diphenylamine comprising the steps of reacting diphenylamine with relatively unreactive olefins consisting predominantly of those from the class consisting of secondary alkenes and internally double bonded tertiary alkenes having from 5 to 12 carbon atoms in the presence of an acidic catalyst at a temperature of from 120° C. to 250° C. and a pressure from atmospheric to 500 pounds per square inch and molar ratios of olefin:diphenylamine of from 1:1 to 10:1 to produce a reaction mixture containing from 75% to 94% of alkylated diphenylamine and from about 6% to 25% of unalkylated diphenylamine, adding to said reaction mixture a second olefin selected from the class consisting of styrene, vinyl naphthalene and the α-methyl derivatives thereof, 2-methyl butene-2, tertiary mono-alkenes having a terminal double bond and from 4 to 10 carbon atoms, and conjugated alkadienes having from 4 to 10 carbon atoms, and reacting said mixture in the presence of an acidic catalyst and under said reaction conditions to provide a final product containing less than 3% of unalkylated diphenylamine.

2. A method in accordance with claim 1 in which said second olefin is styrene.

3. A method in accordance with claim 1 in which said second olefin comprises a tertiary mono-alkene having a terminal double bond and from 4 to 10 carbon atoms.

4. A method of alkylating diphenylamine comprising the steps of reacting diphenylamine with relatively unreactive olefins consisting predominantly of those from the class consisting of secondary alkenes and internally double bonded tertiary alkenes having from 5 to 12 carbon atoms in the presence of an acid activated clay catalyst at a temperature of from 120° C. to 250° C. and a pressure of from atmospheric to 500 lbs./in.$^2$ and molar ratios of olefin:diphenylamine of 1:1 to 10:1 to produce a reaction mixture containing from 75% to 94% of alkylated diphenylamine and from about 6% to 25% of unalkylated diphenylamine, adding to said reaction mixture a second olefin from the class consisting of styrene, vinyl naphthalene and the α-methyl derivatives thereof, 2-methyl-butene-2, tertiary mono-alkenes having a terminal double bond and from 4 to 10 carbon atoms and conjugated alkadienes having from 4 to 10 carbon atoms, and reacting said mixture in the presence of said acid activated clay catalyst and under said reaction conditions to provide a final product containing less than 3% of unalkylated diphenylamine.

5. A method in accordance with claim 4 in which said second olefin is styrene.

6. A method in accordance with claim 4 in which said second olefin comprises a tertiary mono-alkene having a terminal double bond and from 4 to 10 carbon atoms.

7. A method of alkylating diphenylamine comprising the steps of reacting diphenylamine with relatively unreactive olefins consisting predominantly of those from the class consisting of secondary alkenes and internally double bonded tertiary alkenes having from 6 to 10 carbon atoms in the presence of an acid activated clay catalyst at a temperature of 120° to 250° C. and a pressure of from atmospheric to 500 lbs./in.$^2$ and molar ratios of olefin:diphenylamine of from 1:1 to 10:1 to produce a reaction mixture containing from 88% to 94% of alkylated diphenylamine and from about 6% to 12% of unalkylated diphenylamine, adding to said reaction mixture a second olefin selected from the class consisting of styrene, vinyl naphthalene and the α-methyl derivatives thereof, 2-methyl butene-2, tertiary mono-alkenes having a terminal double bond and from 4 to 10 carbon atoms, and conjugated alkadienes having from 4 to 10 carbon atoms and reacting said mixture in the presence of said activated clay catalyst and under said reaction conditions to provide a final product containing less than 3% of unalkylated diphenylamine.

8. A method in accordance with claim 7 in which said second olefin is styrene.

9. A method in accordance with claim 8 in which said relatively unreactive olefin is a mixture of isomeric nonenes consisting predominantly of secondary alkenes.

10. A method in accordance with claim 7 in which said second olefin comprises a tertiary mono-alkene having a terminal double bond and from 4 to 10 carbon atoms.

11. A method in accordance with claim 10 in which said tertiary alkene consists predominantly of 2,4,4, trimethyl pentene-1.

References Cited in the file of this patent

UNITED STATES PATENTS

| | | |
|---|---|---|
| 2,180,936 | Dunbrook | Nov. 21, 1939 |
| 2,189,736 | Lauter | Feb. 6, 1940 |
| 2,370,346 | Gluesenkamp | Feb. 27, 1945 |
| 2,419,735 | Sloan | Apr. 29, 1947 |
| 2,530,769 | Hollis | Nov. 21, 1950 |